Nov. 29, 1938.  C. S. JOHNSON  2,138,277
APPARATUS FOR HANDLING MATERIALS
Filed March 25, 1937   2 Sheets-Sheet 1
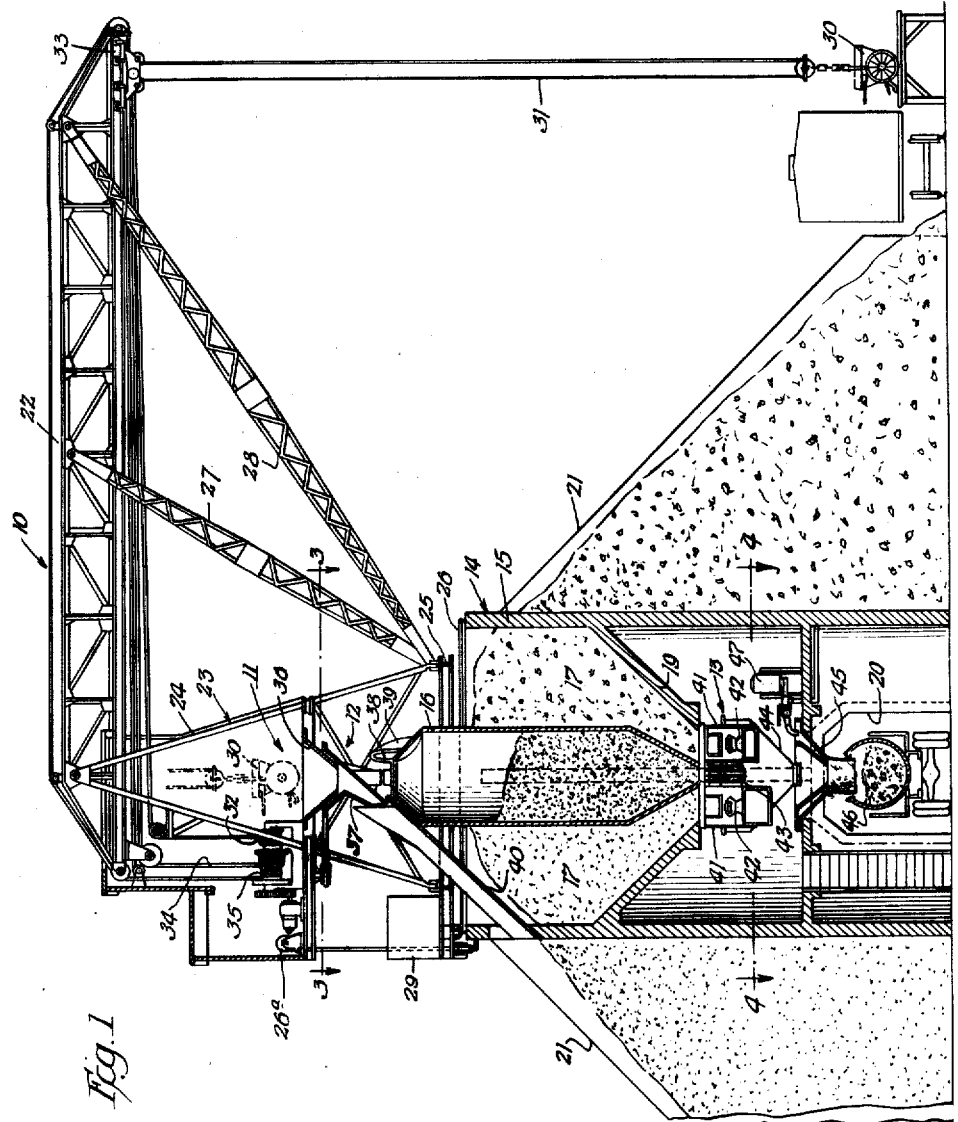
Fig.1
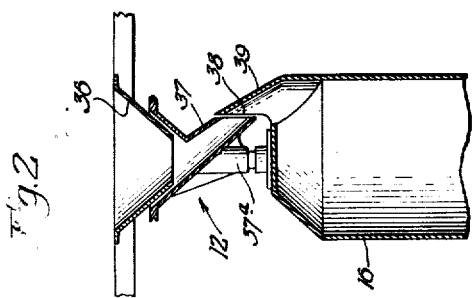
Fig.2
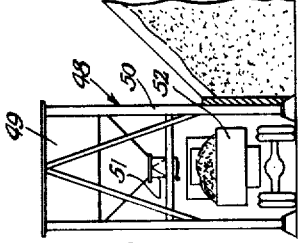
Inventor
Charles S. Johnson
By *Parker, Carlson, Pinner & Hubbard*
Attorneys Nov. 29, 1938.  C. S. JOHNSON  2,138,277
APPARATUS FOR HANDLING MATERIALS
Filed March 25, 1937   2 Sheets-Sheet 2
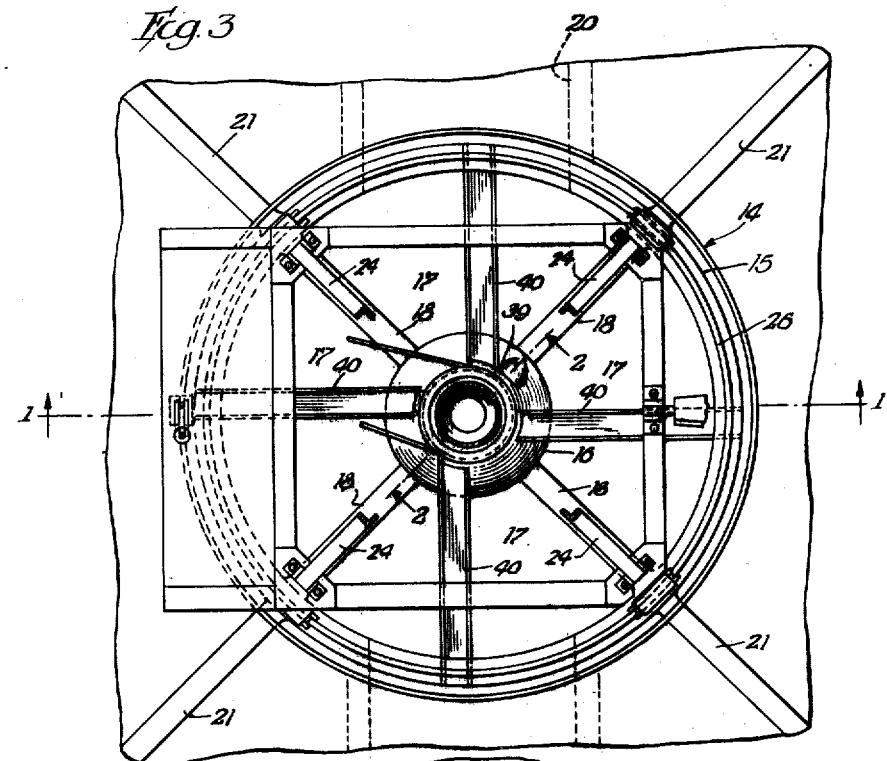
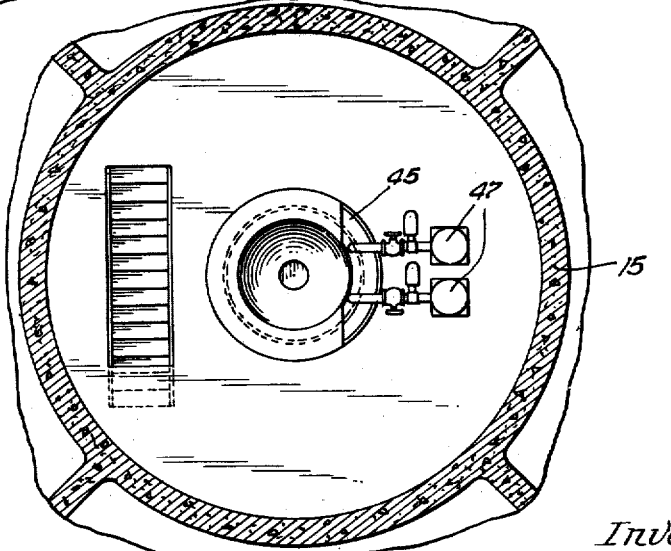
Inventor:
Charles S. Johnson
Attorneys Patented Nov. 29, 1938

2,138,277

UNITED STATES PATENT OFFICE 2,138,277

APPARATUS FOR HANDLING MATERIALS

Charles S. Johnson, Champaign, Ill.

Application March 25, 1937, Serial No. 132,907

4 Claims. (Cl. 259—154)

The invention relates to a novel apparatus for handling bulk construction materials. More particularly, the invention relates to the storing and dispatching of bulk construction materials in a material yard in which a variety of such products is handled. The term "bulk construction materials" refers particularly to such loose generally granular masses of material as sand, gravel, cement, clay, crushed rock, and the like.

Heretofore it has been the practice to store various construction materials in large yards or storage areas by means of a corresponding variety of individual handling equipment. This heterogeneous arrangement has greatly increased in cost and complexity with the expanding use of so-called "premixed" cement concrete, "premixed" asphaltic concrete, oiled gravel mixtures, stabilized-sand-clay mixtures, and the like. These mixtures are ordinarily made by loading the constituents in proper proportions in the vehicle by which they are transported to the point of use, the actual mixing operation being in some instances effected en route and in others, prior to the final dispatching. Consequently, the practice of using separate sets of handling equipment for individual mixtures has resulted in an extremely high machinery investment, excessive labor cost for operation of the multiplicity of devices, and general inconvenience in operation.

The general object of the present invention is to provide a novel apparatus for handling bulk materials by means of which coordinated storing and dispatching of a large variety of materials may be effected economically and expeditiously through the medium of a unified plant.

More specifically, an object of the invention is to provide a system of material handling by which a large variety of bulk construction materials may be selectively transferred from various points in a material yard by a common centrally located handling unit and dispatched in variably proportioned and constituted batches by a common charging unit.

Another object of the invention is to provide an apparatus for bulk building material handling which may be readily adapted to accommodate the effective handling of different varieties or combinations of material without substantial alteration in the apparatus or in general procedure required for its use.

Still another object of the invention is to provide a simplified apparatus for handling bulk building materials which minimizes the number of power operated units required as well as the number of power handling operations, as distinguished from gravity movement operations, and in which a large reserve supply of all materials is always available.

Further objects and advantages of the invention will become apparent as the following description proceeds and the features of novelty which characterize the invention are pointed out with particularity in the claims annexed to and forming a part of this specification.

For a better understanding of the invention, reference may be had to the accompanying drawings in which:

Figure 1 is a side elevation, partly in section, of a novel form of material handling apparatus adapted to carry out the method herein set forth.

Fig. 2 is an enlarged vertical section of a portion of the central distributing mechanism included in the apparatus shown in Fig. 1.

Fig. 3 is an enlarged transverse sectional view along the line 3—3 in Fig. 1.

Fig. 4 is an enlarged fragmentary transverse sectional view along the line 4—4 in Fig. 1.

Referring more particularly to the drawings, the invention has been shown for purposes of illustration and exemplification as embodied in a material handling apparatus particularly adapted to operate in accordance with the following novel plan of procedure. In its preferred form, this plan of procedure includes in general the transfer of various bulk construction materials radially inwardly from the periphery of a material yard to a central elevated point, gravity feeding of the materials into segregated individual masses, and subsequent dispatching of the materials from selected ones of these masses in predetermined amounts to form batches of the desired proportions and constituents. This dispatching operation is also preferably effected by gravity feeding.

In order to accomplish this preferred plan of procedure for material handling as outlined above an apparatus is preferably utilized which includes as its principal elements a crane mechanism 10 which is effective to move material radially inward to a common elevated receiving station at 11, a distributing mechanism 12 selectively operable to feed the material by gravity flow into segregated storage spaces, and a dispatching mechanism 13 for gravitally feeding predetermined amounts of selected ones of the materials into a suitable container to form batches of the desired proportions and constituents.

Storage bin structure

A bin-like structure designated generally by the numeral 14 has been provided and serves to maintain a variety of bulk construction materials in segregated masses. Preferably, this structure affords elevated storage spaces for the materials so that they may be quickly chuted to a vehicle or the like for removal, and the arrangement also makes provision for ample reserve ground storage. In the particular system illustrated, the structure 14 embodies a generally cylindrical cast concrete silo 15 in which a plurality of elevated individual storage compartments is provided. A centrally located compartment is formed by a cylindrical bin 16, and further compartments 17 (Fig. 3) are formed by radially extending partitions 18. The bottom walls of these compartments 17 slant inwardly toward the central axis of the silo 15 and are formed by a conical partition 19 having an open-center communicating with the dispatching mechanism 13.

A tunnel 20 extends through the lower portion of the silo 15 thus forming a convenient covered passageway through which trucks or other vehicles may be moved to position them below the dispatching mechanism 13 for loading. It will be apparent to those skilled in the art that any convenient arrangement of elevated storage bins or compartments distributed around a central point may be effectively utilized in the present system. The compartments illustrated are adapted to store any of a large variety of bulk construction materials such as sand, gravel, crushed rock, clay, cement, and the like. In the event that such a dusty product as cement is to be stored in the structure illustrated it is preferably placed in the closed central storage bin 16.

The silo 15 is surrounded by a comparatively large ground storage area which is generally circular in contour. A series of outwardly extending partitions 21 divide the space around the silo 15 into segregated ground storage areas for piles of excess material. When the material is placed in these piles it is conveniently located for replenishment of the contents of the corresponding storage compartments within the silo 15. It will be noted that the partitions 21 also constitute reenforcing buttresses for the silo.

Crane mechanism

A material transfer apparatus illustrated as the crane mechanism 10 serves as a unitary means for conveying any one of a variety of materials from the periphery of the storage area to the common elevated receiving station 11. Preferably, the apparatus is such that quantities of various materials may be hoisted from unloading points on the periphery of the storage area, traversed radially inward and discharged at the receiving station 11. The crane mechanism illustrated is particularly suited for this purpose.

In the particular construction shown, the crane mechanism 10 embodies a horizontal track boom 22 mounted for swinging horizontal movement about a vertical axis passing through the center of the silo 15 on an open-center crane base designated generally by the numeral 23. This crane base is formed by suitable structural steel A-frames 24 connected to the boom 22 at their apexes. The bottom framework 25 of the crane base is rotatably mounted on a circular track 26 on the top of the silo 15 by suitable wheels. An electric motor drive 26$^a$ or the like is provided for rotation of the crane base 23 and its attached boom. Beams 27 and 28 serve to support the outer portion of the boom 22 and a counterweight 29 balances the overhanging weight thereof.

A material transfer container which is moved by the crane mechanism has been illustrated in the form of a wheeled dump cart 30. It will be understood, however, that other forms of material containers may be utilized, such as a clamshell bucket or the like, especially when the material is to be removed from a gondola car or open bin. One or more roadways and railroad sidings are ordinarily provided at the periphery of the material yard and bulk construction materials unloaded from railroad cars or trucks are gathered in the material transfer container. The container is then hoisted to the boom 22 by a hoisting cable 31 passing over a power driven cable drum 32 housed at the base of the crane mechanism. It is then traversed inwardly along the tramway or track boom 22 by a trolley 33 operated by a traversing cable 34 and power operated cable drum 35. The path of movement of the trolley 33 is such that the material transfer container 30 may be traversed inwardly to the axis of rotation of the crane, thus reaching the position shown in dot-dash lines in Fig. 1 at the receiving station 11 from which it is dispatched to storage bins or storage piles by the distributing mechanism 12.

The crane mechanism 10 may also be utilized to transfer material from the ground storage piles about the silo 15 to the distributing mechanism 12 for reclamation of material to refill the storage bins within the silo. It will thus be seen that the transfer mechanism provided is extremely flexible in that this single unitary mechanism can be utilized to transfer material between any selected points within the area covered by the boom 22 in its rotary movement. As a consequence, material may be unloaded at any point on the periphery of the storage area and readily transferred to the silo 15. Also, as was noted, the same transfer mechanism is utilized for reclaiming ground storage material.

Distributing mechanism

The distributing mechanism 12 in general serves to effect a gravity flow of material discharged at the receiving station 11 to any selected one of the bins 16 or 17 or alternatively to the ground storage spaces about the silo 15. To this end a revolving compartment selector is provided including a conical hopper 36 positioned at the center of the crane base 23 to receive material dumped from the transfer container 30. The hopper 36 communicates with a rotatable spout 37 mounted on a vertical shaft 37$^a$ (Fig. 2) journaled on the top of the bin 16 and which may be swung into registry with the open tops of any one of the bins 17 or into registry with an opening 38 in the upper end of the bin 16. A baffle 39 about the opening 38 directs material discharged therein downwardly into the interior of the bin 16. It will be understood that the hopper 36 may be made integral with the spout 37 if desired. The operator is able to dispatch the material quickly and efficiently to its corresponding storage compartment.

In the event that a storage compartment becomes filled, the material is gravitally fed to the corresponding ground storage pile located exteriorly of the silo 15 by a selected one of a series of inclined chutes 40 which overlie the tops of the bins 17. The upper ends of the chutes 40 are disposed adjacent the distributor mechanism spout 37 so that it may be swung into registry with any selected one of the chutes to discharge material into the corresponding ground storage pile.

Dispatching mechanism

A single unitary dispatching mechanism is utilized to withdraw and isolate predetermined or measured quantities of material from selected ones of the storage bins and transfer the same to a vehicle or other container to form batches of desired proportions and constituents. This dispatching mechanism 13 has been illustrated in the form of a batching or measuring mechanism. Such batching mechanisms are well known in the art and consequently, need not be described in detail. For present purposes, it is believed to be sufficient to say that this mechanism includes a series of valves 41 communicating with the respective storage bins and adapted to discharge predetermined quantities of the material from the bins as determined by the associated weighing scales 42, the operation of the batching valves being controlled automatically or manually by levers 43.

The constituent materials for a selected type of batch are discharged from the individual material valves 41 into a common conical hopper 44 from which they pass to a loading hopper 45 positioned above a container such as the mixing truck 46 located in the tunnel 20. In the event that premixed concrete is to be made, for example, the necessary cement, sand and rock are discharged in the proper proportions into the hopper 44 and thence into the hopper 45 and at the same time, a predetermined amount of water is added to the mixture from a suitable pumping mechanism 47. This isolated batch or mixture having been discharged into the tank of the mixing truck 46, it is thoroughly mixed en route to the construction site by rotation of the tank in the usual manner. It will be understood that other liquid dispensing devices may be had in addition to the water supply apparatus 47 as, for example, a source of oil for use in preparing oil and gravel mixtures for road construction.

An alternatively available dispatching mechanism designated generally by the numeral 48 has been illustrated in Fig. 1. This mechanism is principally useful in the event that it is desired to load dump trucks or the like with a single material and to carry out the loading with great rapidity. For this purpose, a bin 49 is supported in elevated position by a framework 50 and a batching hopper 51 serves to discharge the required amount of material for a complete load for a truck 52. The crane mechanism 10 may be utilized to replenish the contents of the bin 49 either from the ground storage piles about the silo 15 or from the material received at the various unloading points about the periphery of the yard.

Brief résumé of operation

In the operation of the system described above, various materials such as cement, sand, gravel, crushed rock, and the like are unloaded at one or more selected unloading points preferably on the periphery of the material yard. These unloaded materials are gathered in the container 30 or other suitable material-transfer container, then hoisted and traversed inwardly by the crane mechanism 10 to the common centrally located receiving station 11. The operator rotates the distributor spout 37 until it registers with the top of the bin in which the particular type of material is to be stored and the container is dumped into the hopper 36 through which it flows by gravity into the spout 37 and thence into the selected storage compartment or bin. This operation is continued as various supplies of material arrive until one or more of the bins has become filled. In this event, the operator then chutes the excess material discharged at the receiving station 11 into a ground storage pile corresponding to the filled bin by swinging the discharge spout 37 into registry with the proper one of the overhead chutes 40.

As various mixtures of material are required from time to time trucks or other suitable containers are positioned in the tunnel 20 beneath the batching mechanism and the desired mixture is formed by withdrawing predetermined amounts of the selected materials from the various storage bins through the medium of the batching mechanism 13 and the batch is then discharged into the container. As the contents of the storage bins and silo 15 become depleted from time to time in the course of these operations, the bins are replenished by utilizing the same transfer mechanism 10 to hoist material from the storage piles surrounding the silo, convey the same to the central receiving station 11, and then distribute it to the proper storage compartment.

It will thus be seen that a very simple and effective arrangement has been provided by means of which a large and changing variety of bulk construction materials may be expeditiously and economically handled in a single unified material yard. Moreover, the handling operations are carried out with a single transfer mechanism and the distribution of the various products is controlled from a common central station minimizing not only the labor required but also making possible effective and efficient control of the various operations.

Although a particular embodiment of the invention has been shown and described in some detail for purposes of illustration, there is no intention to thereby limit the invention to such preferred embodiment.

I claim as my invention:

1. A system of the character described for handling a variety of bulk construction materials comprising, in combination, a bin-like structure defining a plurality of segregated storage compartments, a rotatable open-center crane-base mounted above said structure, a radially extending horizontal load transfer track boom carried by said base and adapted to swing about a vertical axis upon rotation of said base, a material-transfer container supported by said track boom, power means including a hoisting and traversing mechanism associated with said boom for hoisting said container and traversing the same along said boom toward said axis of rotation, a distributing mechanism alined with said open-center of said base for receiving material dumped from the hoisted and traversed container and gravitally transferring the same into any selected one of said compartments, and batching means for weighing and gravitally transferring predetermined portions of the material in selected ones of said compartments to a second container or the like to form a batch of predetermined constituents and proportions.

2. A system of the character described comprising a bin-like structure defining a plurality of segregated storage compartments, a selectively operable distributing mechanism located above said structure for gravitally transferring material dumped therein into any selected one of said compartments, a single transfer mechanism located outside said structure for gathering material from any point or points in the area about said structure and conveying the same to said distributing mechanism, and batching means for gravitally feeding predetermined portions of the material from selected ones of said compartments into a container or the like to form a batch of selected constituents and proportions.

3. A system of the character described comprising a bin-like structure defining a plurality of segregated storage compartments located at the center of a ground storage area, a distributing mechanism located above said structure for gravitally selectively transferring material dumped therein into any selected one of said compartments or into a selected position of said ground storage area surrounding said structure, a single transfer mechanism including a boom adapted to swing about said distributing mechanism as a center for hoisting and conveying material to said distributing mechanism, thereby serving to convey material from unloading points at the periphery of said area and to reclaim material from said ground storage piles, and batching means for feeding predetermined portions of the material from selected ones of said compartments into a container or the like to form a batch of selected constituents and proportions.

4. A system of the character described for handling a variety of bulk construction materials comprising, in combination, an elevated cylindrical structure having partitions therein defining a plurality of segregated storage compartments distributed about a vertical center line, an open-center crane-base, means including a circular track on said structure and cooperating wheels on said crane-base for rotatably mounting the same, a horizontal boom carried by said base and adapted to swing about a vertical axis upon rotation of said base, a material-transfer container, power means including a hoisting and traversing mechanism associated with said boom for hoisting said container and traversing the same along said boom toward said axis of rotation, a distributing mechanism alined with said open-center of said base for receiving material dumped from the hoisted and traversed container and gravitally transferring the same into a selected one of said compartments or into a selected portion of said ground storage area surrounding said structure, and batching means for gravitally feeding predetermined portions of the material from selected ones of said elevated compartments radially inward toward said center line and into a second container or the like to form a batch of selected constituents and proportions.

CHARLES S. JOHNSON.

CERTIFICATE OF CORRECTION.

Patent No. 2,138,277.   November 29, 1938.

CHARLES S. JOHNSON.

It is hereby certified that error appears in the printed specification of the above numbered patent requiring correction as follows: Page 1, first column, line 26, after the word "individual" insert materials and for producing individual; line 49, before "general" insert the; page 4, first column, line 15, claim 3, strike out "selectively" and insert the same after "for", line 14, same claim; and line 17, same claim 3, for "position" read portion; and that the said Letters Patent should be read with this correction therein that the same may conform to the record of the case in the Patent Office.

Signed and sealed this 7th day of February, A. D. 1939.

Henry Van Arsdale.

(Seal)   Acting Commissioner of Patents.

said compartments, a single transfer mechanism located outside said structure for gathering material from any point or points in the area about said structure and conveying the same to said distributing mechanism, and batching means for gravitally feeding predetermined portions of the material from selected ones of said compartments into a container or the like to form a batch of selected constituents and proportions.

3. A system of the character described comprising a bin-like structure defining a plurality of segregated storage compartments located at the center of a ground storage area, a distributing mechanism located above said structure for gravitally selectively transferring material dumped therein into any selected one of said compartments or into a selected position of said ground storage area surrounding said structure, a single transfer mechanism including a boom adapted to swing about said distributing mechanism as a center for hoisting and conveying material to said distributing mechanism, thereby serving to convey material from unloading points at the periphery of said area and to reclaim material from said ground storage piles, and batching means for feeding predetermined portions of the material from selected ones of said compartments into a container or the like to form a batch of selected constituents and proportions.

4. A system of the character described for handling a variety of bulk construction materials comprising, in combination, an elevated cylindrical structure having partitions therein defining a plurality of segregated storage compartments distributed about a vertical center line, an open-center crane-base, means including a circular track on said structure and cooperating wheels on said crane-base for rotatably mounting the same, a horizontal boom carried by said base and adapted to swing about a vertical axis upon rotation of said base, a material-transfer container, power means including a hoisting and traversing mechanism associated with said boom for hoisting said container and traversing the same along said boom toward said axis of rotation, a distributing mechanism alined with said open-center of said base for receiving material dumped from the hoisted and traversed container and gravitally transferring the same into a selected one of said compartments or into a selected portion of said ground storage area surrounding said structure, and batching means for gravitally feeding predetermined portions of the material from selected ones of said elevated compartments radially inward toward said center line and into a second container or the like to form a batch of selected constituents and proportions.

CHARLES S. JOHNSON.

CERTIFICATE OF CORRECTION.

Patent No. 2,138,277.   November 29, 1938.

CHARLES S. JOHNSON.

It is hereby certified that error appears in the printed specification of the above numbered patent requiring correction as follows: Page 1, first column, line 26, after the word "individual" insert materials and for producing individual; line 49, before "general" insert the; page 4, first column, line 15, claim 3, strike out "selectively" and insert the same after "for", line 14, same claim; and line 17, same claim 3, for "position" read portion; and that the said Letters Patent should be read with this correction therein that the same may conform to the record of the case in the Patent Office.

Signed and sealed this 7th day of February, A. D. 1939.

Henry Van Arsdale.

(Seal)   Acting Commissioner of Patents.